(12) United States Patent
Tsuda

(10) Patent No.: US 10,935,848 B2
(45) Date of Patent: Mar. 2, 2021

(54) LIQUID CRYSTAL DISPLAY DEVICE, MANUFACTURING METHOD FOR LIQUID CRYSTAL DISPLAY DEVICE AND ELECTRIC DEVICE

(71) Applicant: Panasonic Liquid Crystal Display Co., Ltd., Himeji (JP)

(72) Inventor: Kazuhiko Tsuda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 57 days.

(21) Appl. No.: 16/287,707

(22) Filed: Feb. 27, 2019

(65) Prior Publication Data

US 2019/0278116 A1    Sep. 12, 2019

(30) Foreign Application Priority Data

Mar. 12, 2018    (JP) .............................. JP2018-044624

(51) Int. Cl.
*G02F 1/1333*    (2006.01)
*G02F 1/1339*    (2006.01)
*G02F 1/1368*    (2006.01)
*G02F 1/1345*    (2006.01)
*G02F 1/1343*    (2006.01)
*G02F 1/1362*    (2006.01)

(52) U.S. Cl.
CPC .......... *G02F 1/1339* (2013.01); *G02F 1/1345* (2013.01); *G02F 1/1368* (2013.01); *G02F 1/13439* (2013.01); *G02F 1/136286* (2013.01); *G02F 2001/133354* (2013.01); *G02F 2201/50* (2013.01)

(58) Field of Classification Search
CPC .............................. G02F 1/1345; G02F 1/1339
See application file for complete search history.

(56) References Cited

U.S. PATENT DOCUMENTS

2012/0194756 A1*  8/2012  Hayakawa ............ H01L 27/127
                                                             349/43
2020/0341322 A1* 10/2020  Shan .................... G02F 1/13454

FOREIGN PATENT DOCUMENTS

JP          2010-126398        6/2010

* cited by examiner

*Primary Examiner* — Richard H Kim

(74) *Attorney, Agent, or Firm* — Hamre, Schumann, Mueller & Larson, P.C.

(57) ABSTRACT

A liquid crystal display device according to a present disclosure comprises: a thin film transistor substrate including a thin film transistor array; a counter substrate opposed to the thin film transistor substrate; and a liquid crystal layer disposed between the thin film transistor substrate and the counter substrate, wherein the thin film transistor substrate includes: an overlapping part that overlaps with the counter substrate in planar view; and a non-overlapping part that includes a terminal portion and does not overlap with the counter substrate in planar view, and an outer shape of the non-overlapping part has a non-rectangular shape in planar view.

10 Claims, 16 Drawing Sheets

DISPLAY
SURFACE SIDE
↑
←—→ ROW
↓   DIRECTION
REAR
SURFACE SIDE

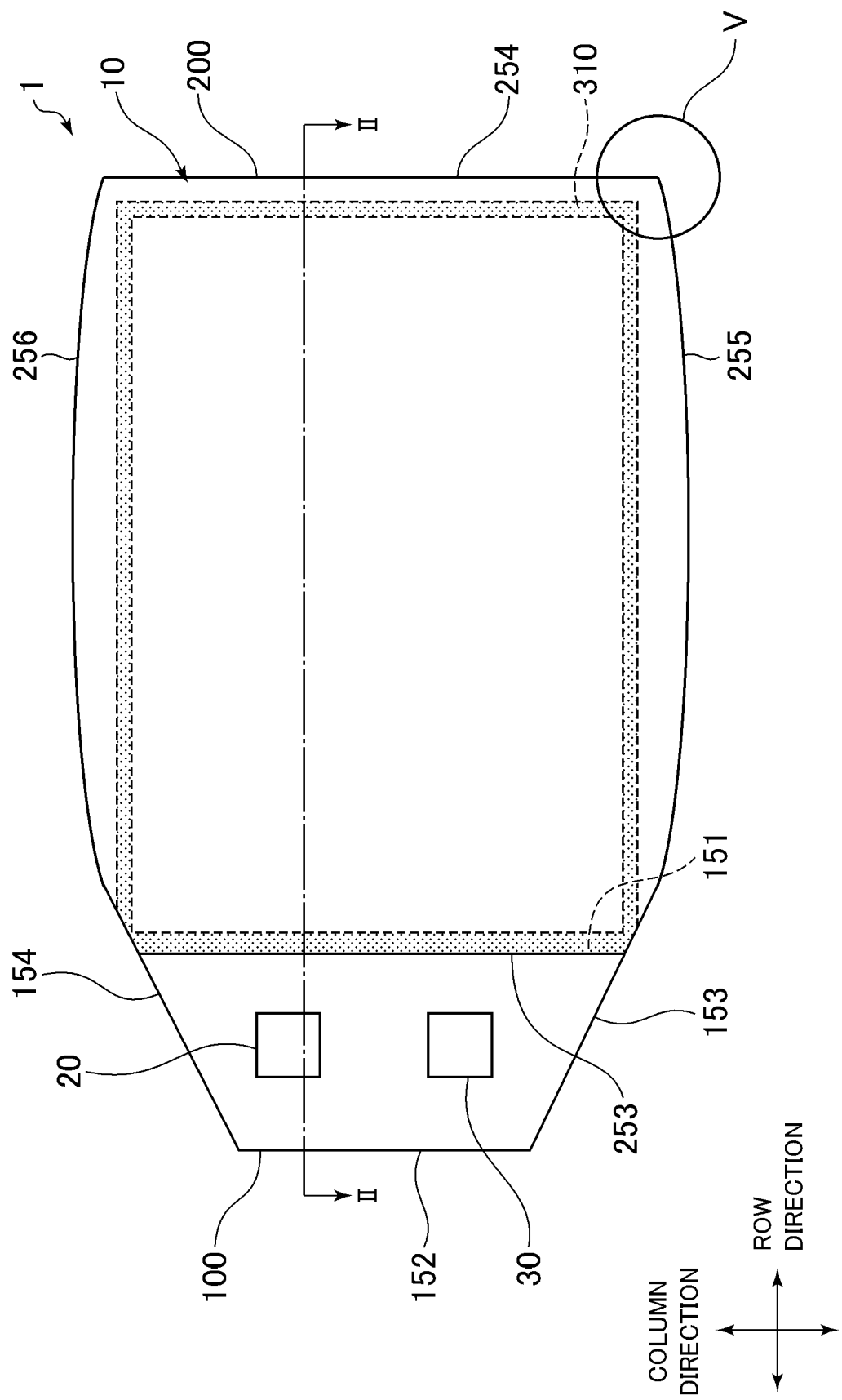

LIQUID CRYSTAL DISPLAY DEVICE, MANUFACTURING METHOD FOR LIQUID CRYSTAL DISPLAY DEVICE AND ELECTRIC DEVICE

CROSS-REFERENCE TO RELATED APPLICATION

This application claims priority from Japanese application JP 2018-044624, filed Mar. 12, 2018. This Japanese application is incorporated herein by reference.

BACKGROUND

1. Technical Field

The present disclosure relates to a liquid crystal display device, a method for manufacturing a liquid crystal display device, and an electric device.

2. Description of the Related Art

In a conventional method for manufacturing a liquid crystal display device, a color filter substrate and a thin film transistor substrate are prepared, a liquid crystal seal is formed along a peripheral edge of at least one of both the substrates, and both the substrates are bonded together. Subsequently, liquid crystal is dropped in a region surrounded by the liquid crystal seal to form a liquid crystal layer. Subsequently, both the substrates are subjected to a laser beam irradiation step and an etching step, and divided and segmented. At this point, an etching resistant seal is interposed between both the substrates so as to overlap with a region irradiated with a laser beam in planar view, whereby an etching solution is prevented from entering between both the substrates in the etching step. Subsequently, the etching resistant seal was peeled off to perform the segmentation (see Unexamined Japanese Patent Publication No. 2010-126398).

SUMMARY

In the conventional manufacturing method, there is a risk of corrosion of a terminal portion connected to a driver IC mounted on the thin film transistor substrate. That is, in the conventional manufacturing method, because the region is irradiated with the laser beam so as to overlap with the etching resistant seal in planar view, the etching resistant seal is damaged, there is a possibility that a gap is generated between the etching resistant seal and both the substrates, and that the etching solution enters from the gap. For this reason, there is a risk that the terminal portion was corroded in the etching step.

The present disclosure has been made in view of the above problems, and an object of the present disclosure is to reduce the risk of the corrosion of the terminal portion in the method for manufacturing a liquid crystal display device including the etching step.

A method for manufacturing a liquid crystal display device including a thin film transistor substrate including a thin film transistor array and a counter substrate opposed to the thin film transistor substrate, the thin film transistor substrate including an overlapping part that overlaps with the counter substrate in planar view and a non-overlapping part that includes a terminal portion and does not overlap with the counter substrate in planar view, the method for manufacturing a liquid crystal display device according to a present disclosure comprises: a first substrate preparing step of preparing a first substrate including the thin film transistor substrate; a second substrate preparing step of preparing a second substrate including the counter substrate; a first seal member forming step of forming an annular first seal member surrounding an outer periphery of the terminal portion in planar view between the first substrate and the second substrate; a second seal member forming step of forming an annular second seal member disposed along an outer edge of the overlapping part in planar view between the first substrate and the second substrate; an etching step of separating an entire region including a region where the first seal member is formed and a region where the second seal member is formed in planar view from the first substrate and the second substrate by performing wet etching of an outer edge of the entire region; a division step of dividing the first substrate and the second substrate along a part of an outer edge of the non-overlapping part after the etching step; and a terminal exposure step of separating the counter substrate from the second substrate by cutting the second substrate along a boundary between the overlapping part and the non-overlapping part after the division step.

A liquid crystal display device according to a present disclosure comprises: a thin film transistor substrate including a thin film transistor array; a counter substrate opposed to the thin film transistor substrate; and a liquid crystal layer disposed between the thin film transistor substrate and the counter substrate, wherein the thin film transistor substrate includes: an overlapping part that overlaps with the counter substrate in planar view; and a non-overlapping part that includes a terminal portion and does not overlap with the counter substrate in planar view, and an outer shape of the non-overlapping part has a non-rectangular shape in planar view.

The method for manufacturing a liquid crystal display device according to the present disclosure can manufacture the liquid crystal display device in which the risk of the corrosion of the terminal portion is reduced.

BRIEF DESCRIPTION OF DRAWINGS

FIG. 18 is a schematic plan view illustrating another configuration of a liquid crystal display device according to the exemplary embodiment.

DETAILED DESCRIPTION

Exemplary Embodiment

An exemplary embodiment will be described below with reference to the drawings.

[Liquid Crystal Display Device]

Figure 1:
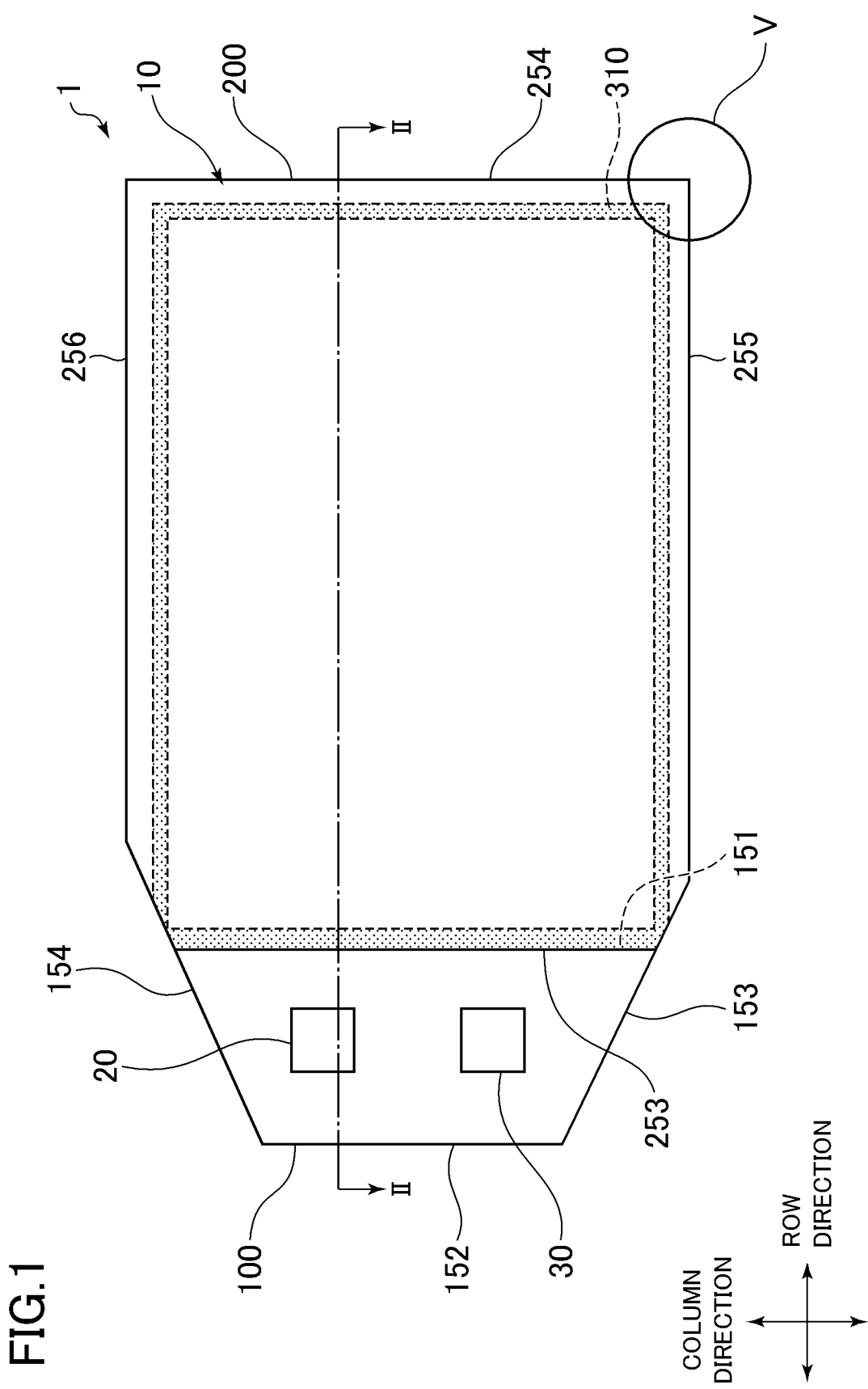
FIG. 1 is a schematic plan view illustrating a schematic configuration of liquid crystal display device according to an exemplary embodiment.
Figure 2:
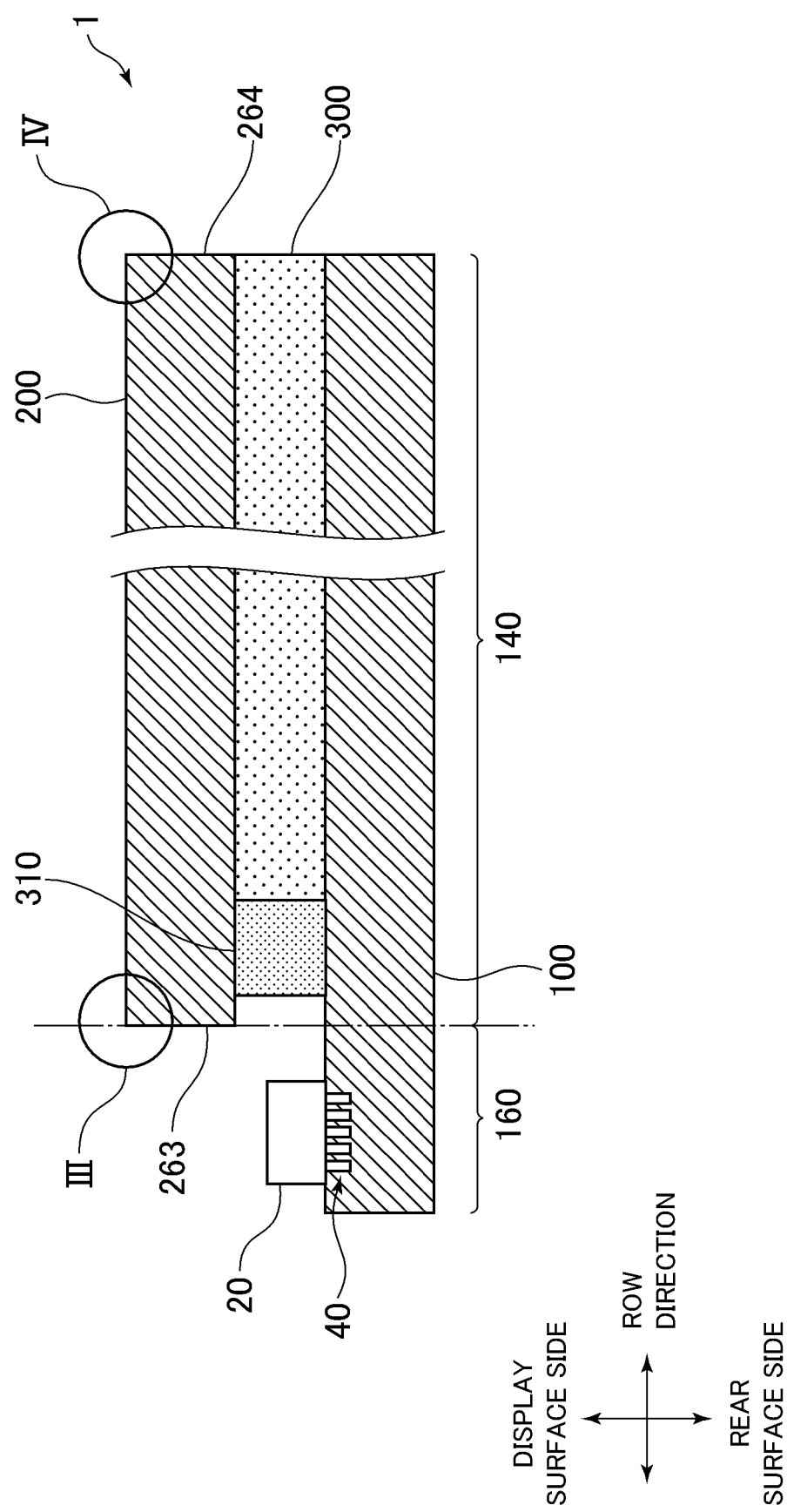
FIG. 2 is a schematic sectional view illustrating a sectional structure taken along line II-II in FIG. 1.

A liquid crystal display device according to an exemplary embodiment of the present disclosure will be described below with reference to the drawings. FIG. 1 is a schematic plan view illustrating a schematic configuration of liquid crystal display device 1 of the exemplary embodiment, and FIG. 2 is a schematic sectional view illustrating a sectional structure taken along line II-II in FIG. 1.

Liquid crystal display device 1 includes display panel 10, a driver (for example, source driver IC 20 and gate driver IC 30), a control circuit (not illustrated), and a backlight device (not illustrated). Display panel 10 includes thin film transistor substrate 100 including a thin film transistor array, a counter substrate 200 opposed to thin film transistor substrate 100, and liquid crystal layer 300 disposed between thin film transistor substrate 100 and counter substrate 200. Seal member 310 surrounding an outer periphery of liquid crystal layer 300 is disposed between a first main surface (display surface side) of thin film transistor substrate 100 and a second main surface (rear surface side) of counter substrate 200, and thin film transistor substrate 100 and counter substrate 200 are bonded and fixed to each other by seal member 310. Liquid crystal layer 300 is disposed while being surrounded by thin film transistor substrate 100, counter substrate 200, and seal member 310, and the liquid crystal included in liquid crystal layer 300 is sealed in an inner peripheral side of seal member 310.

Thin film transistor substrate 100 includes overlapping part 140 that overlaps with counter substrate 200 in planar view and non-overlapping part 160 that does not overlap with counter substrate 200 in planar view. Terminal portion 40 electrically connected to drivers 20, 30 is disposed on the first main surface (display surface side) of non-overlapping part 160. In liquid crystal display device 1 of the exemplary embodiment, non-overlapping part 160 is disposed on one side (left side in FIG. 1) of display panel 10. In other words, non-overlapping part 160 protrudes in a row direction (first direction) from counter substrate 200 in planar view. An area of thin film transistor substrate 100 is larger than that of counter substrate 200 by an amount of non-overlapping part 160 in planar view.

Source driver IC 20 and gate driver IC 30 are directly mounted on a glass substrate constituting thin film transistor substrate 100 in non-overlapping part 160. That is, COG (Chip On Glass) system liquid crystal display device 1 is illustrated in FIG. 1. Source driver IC 20 and gate driver IC 30 are disposed in line (in FIG. 1, column direction) along one side of display panel 10. In the exemplary embodiment, one source driver IC 20 and one gate driver IC 30 are illustrated, but the numbers of source driver ICs 20 and gate driver ICs 30 are not limited to one. Liquid crystal display device 1 of the present disclosure is not limited to the COG system, and may be liquid crystal display device 1 of a COF (Chip On Film) system or a TCP (Tape Carrier Package) system.

As illustrated in FIG. 1, non-overlapping part 160 has a non-rectangular shape in planar view, and non-overlapping part 160 has a trapezoidal shape in planar view in the exemplary embodiment. More specifically, first side 151 adjacent to overlapping part 140 in an outer shape of non-overlapping part 160 constitutes a longer base in two bases of the trapezoid. Second side 152 that constitutes an outer edge of non-overlapping part 160 and is opposed to first side 151 is a shorter base in two bases of the trapezoid. In addition to first side 151 and second side 152, the outer shape of non-overlapping part 160 is formed by first leg 153 and second leg 154 that connect first side 151 and second side 152. In the exemplary embodiment, non-overlapping part 160 has the non-rectangular shape. In particular, non-overlapping part 160 has a feature that one side has an angle smaller than 90 degrees with respect to the other side (in the embodiment, the base) adjacent to the one side.

As illustrated in FIG. 1, counter substrate 200 of the exemplary embodiment has third side 253 that overlaps with first side 151 in planar view, fourth side 254 opposed to third side 253, and fifth side 255 intersecting fourth side 254.

Figure 3:
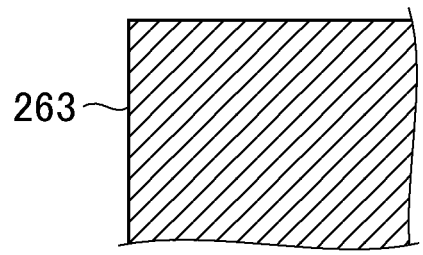
FIG. 3 is a schematic enlarged sectional view illustrating a portion III in FIG. 2.
Figure 4:
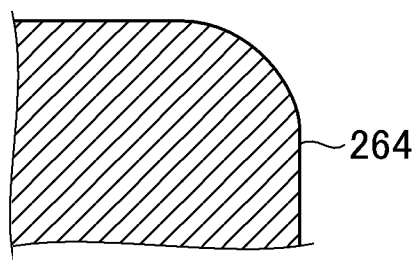
FIG. 4 is a schematic enlarged sectional view illustrating a portion IV in FIG. 2.

FIG. 3 is a schematic enlarged view illustrating a portion III in FIG. 2, and illustrates an end where section 263 of third side 253 of counter substrate 200 and the display surface of counter substrate 200 intersect each other. FIG. 4 is a schematic enlarged view illustrating a portion IV in FIG. 2, and illustrates an end where section 264 of fourth side 254 of counter substrate 200 and the display surface of counter substrate 200 intersect each other.

As illustrated in FIG. 3, section 263 of third side 253 of counter substrate 200 and the display surface of counter substrate 200 intersect each other at substantially right angles. On the other hand, as illustrated in FIG. 4, the end where section 264 of fourth side 254 of counter substrate 200 and the display surface of the counter substrate 200 intersect each other has a rounded shape. That is, a curvature of the end where section 264 of fourth side 254 and the display surface of the counter substrate 200 intersect each other is smaller than a curvature of the end where section 263 of third side 253 and the display surface of the counter substrate 200 intersect each other.

Figure 5:
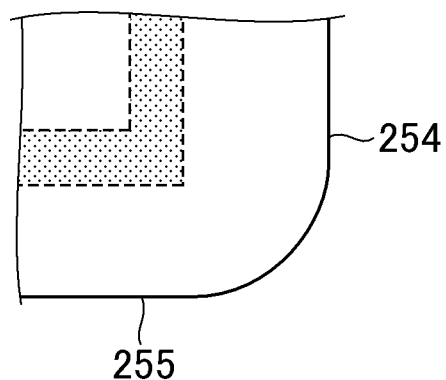
FIG. 5 is a schematic enlarged plan view illustrating a portion V in FIG. 1.

FIG. 5 is a schematic enlarged view illustrating a portion V in FIG. 1, and illustrates an end where fourth side 254 and fifth side 255 intersect each other. As illustrated in FIG. 5, the end where fourth side 254 and fifth side 255 intersect each other has a rounded shape.

In the example of FIG. 1, fifth side 255 is illustrated as a straight line. However, as illustrated in FIG. 18, fifth side 255 is desirably curved outward in planar view. Similarly, sixth side 256 opposed to fifth side 255 is also desirably curved outward in planar view.

Figure 6:
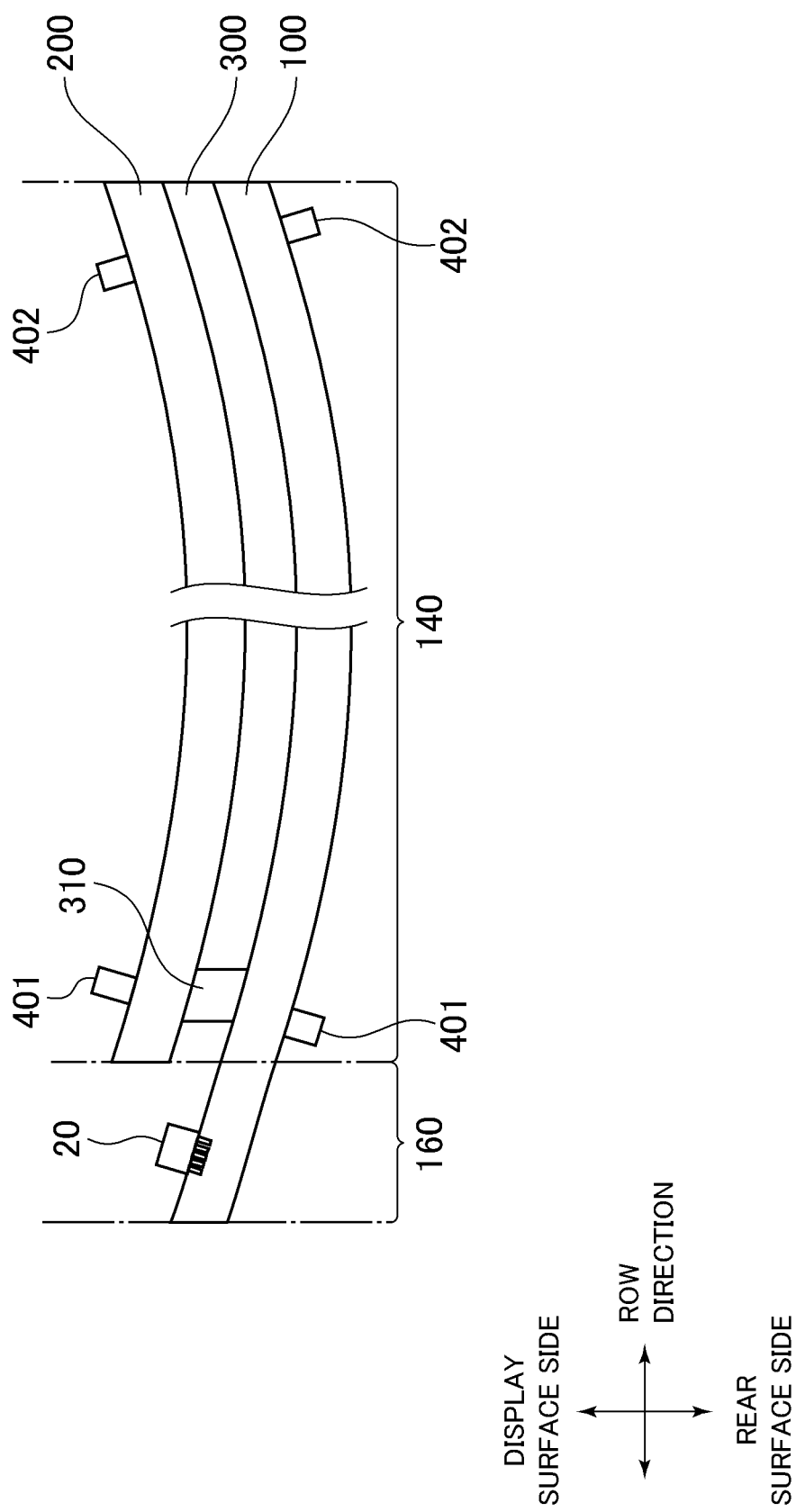
FIG. 6 is a schematic side view illustrating an example in which liquid crystal display device is mounted on an electric device.

In this way, by curving at least one of fifth side 255 and sixth side 256 outward in planar view, for example, in the case where liquid crystal display device 1 is curved when viewed from the side surface as illustrated in FIG. 6, generation of a crack of counter substrate 200 and thin film transistor substrate 100 can be prevented in a central portion on which stress concentrates easily.

FIG. 6 is a schematic side view illustrating an example in which liquid crystal display device 1 is mounted on an electric device. In the exemplary embodiment, as illustrated in FIG. 6, first holding member 401 and second holding member 402, between which the display surface side of counter substrate 200 and the rear surface side of thin film transistor substrate 100 are sandwiched, are provided at a position where the electric device overlaps with overlapping part 140 in planar view.

The position of first holding member 401 holding the shape of thin film transistor substrate 100 is set in overlapping part 140. Consequently, an average curvature in non-overlapping part 160 is smaller than a minimum curvature in overlapping part 140 when viewed from a side-surface direction. With this configuration, in non-overlapping part 160 that has a higher possibility that a microcrack remains in thin film transistor substrate 100 as compared with overlapping part 140, the generation of the crack of display panel 10 due to the microcrack can be prevented. The reason why non-overlapping part 160 has the higher possibility that the microcrack remains in thin film transistor substrate 100 as compared with overlapping part 140 will be described later in a method for manufacturing liquid crystal display device 1.

A polarizing plate (not illustrated) is formed on the second main surface (rear surface side) of thin film transistor substrate 100 and the first main surface (display surface side) of counter substrate 200, and a backlight device is disposed on the rear surface side of the polarizing plate provided on the rear surface side of thin film transistor substrate 100.

Figure 7:
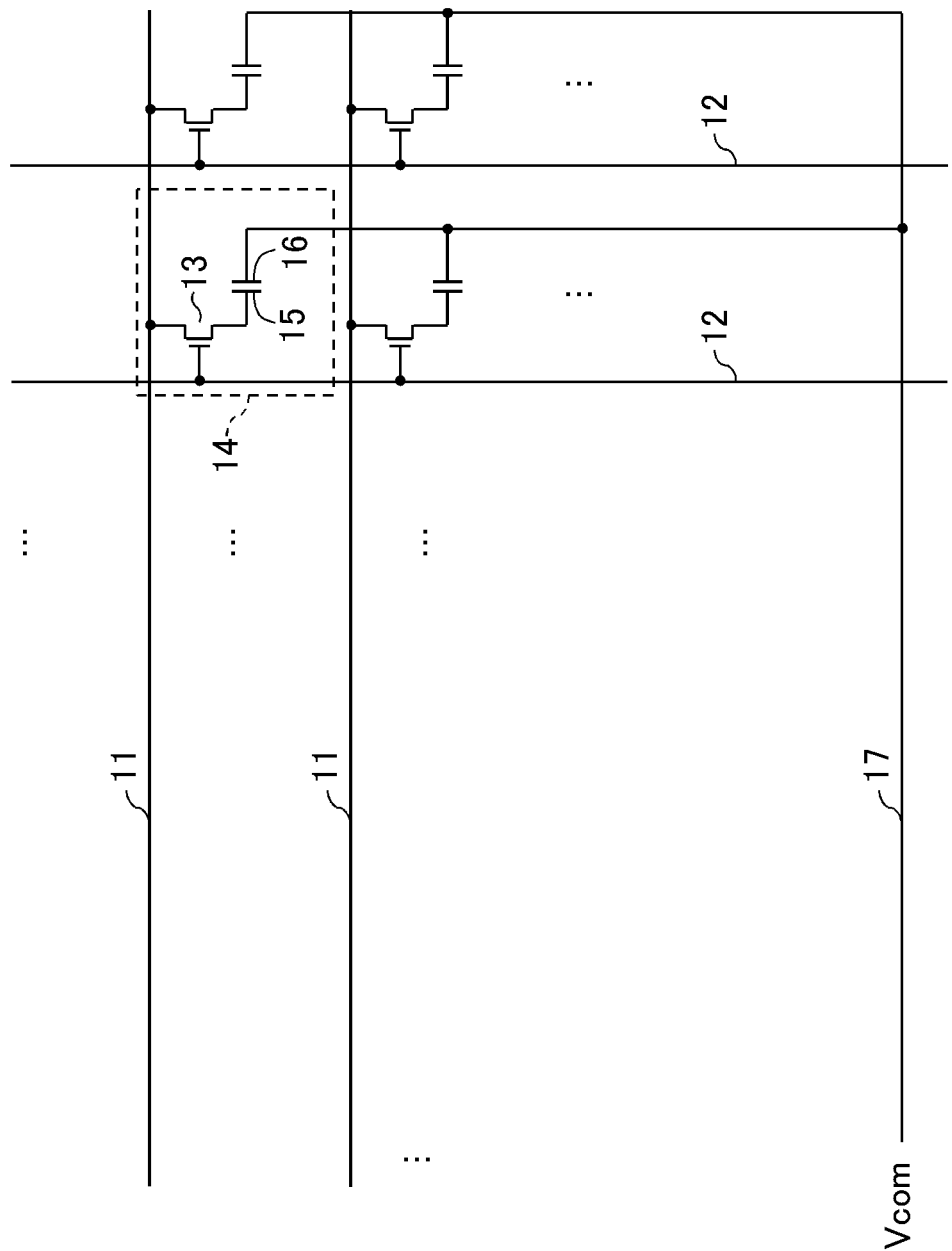
FIG. 7 is an equivalent circuit diagram illustrating a schematic configuration of a display region of display panel.

FIG. 7 is an equivalent circuit diagram illustrating a schematic configuration of a display region of display panel 10. A plurality of data lines 11 extending in the first direction (for example, the column direction) and a plurality of gate lines 12 extending in a second direction (for example, a row direction) are provided in display panel 10. Thin film transistor (TFT) 13 is provided in an intersection of each data line 11 and each gate line 12. Each data line 11 is electrically connected to corresponding source driver IC 20 (see FIG. 1), and each gate line 12 is electrically connected to corresponding gate driver IC 30 (see FIG. 1).

In display panel 10, a plurality of pixels 14 are arranged into a matrix shape (the row direction and the column direction) corresponding to the intersections of data lines 11 and gate lines 12. A plurality of pixel electrodes 15 disposed in each pixel 14 and common electrode 16 common to the plurality of pixels 14 are provided in TFT substrate 100.

A data signal (data voltage) is supplied from corresponding source driver IC 20 to each data line 11. A gate signal (gate-on voltage, gate-off voltage) is supplied from corresponding gate driver IC 30 to each gate line 12. Common voltage Vcom is supplied from a common driver (not illustrated) to common electrode 16 through common line 17. When an on voltage (gate-on voltage) of the gate signal is supplied to gate line 12, TFT 13 connected to gate line 12 is turned on, and the data voltage is supplied to pixel electrode 15 through data line 11 connected to TFT 13. An electric field is generated by a difference between the data voltage supplied to pixel electrode 15 and common voltage Vcom supplied to common electrode 16. Liquid crystal is driven by the electric field to control transmittance of light emitted from the backlight, thereby displaying an image. For performing color display, a desired data voltage is supplied to data line 11 connected to pixel electrode 15 of pixel 14 corresponding to each of red, green, and blue colors, which are formed by a stripe-shaped color filter.

Figure 8:
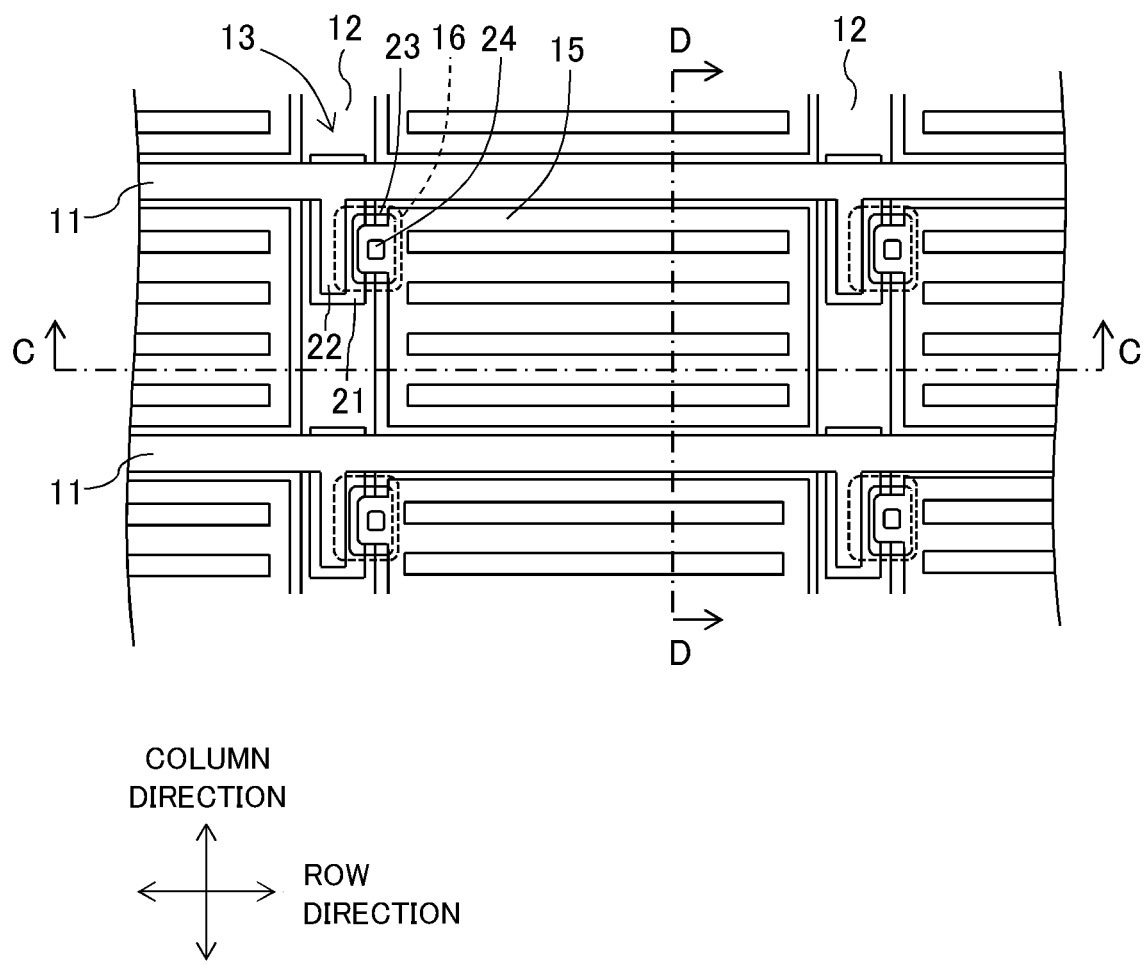
FIG. 8 is a plan view illustrating a specific configuration of pixels of display panel.
Figure 9:
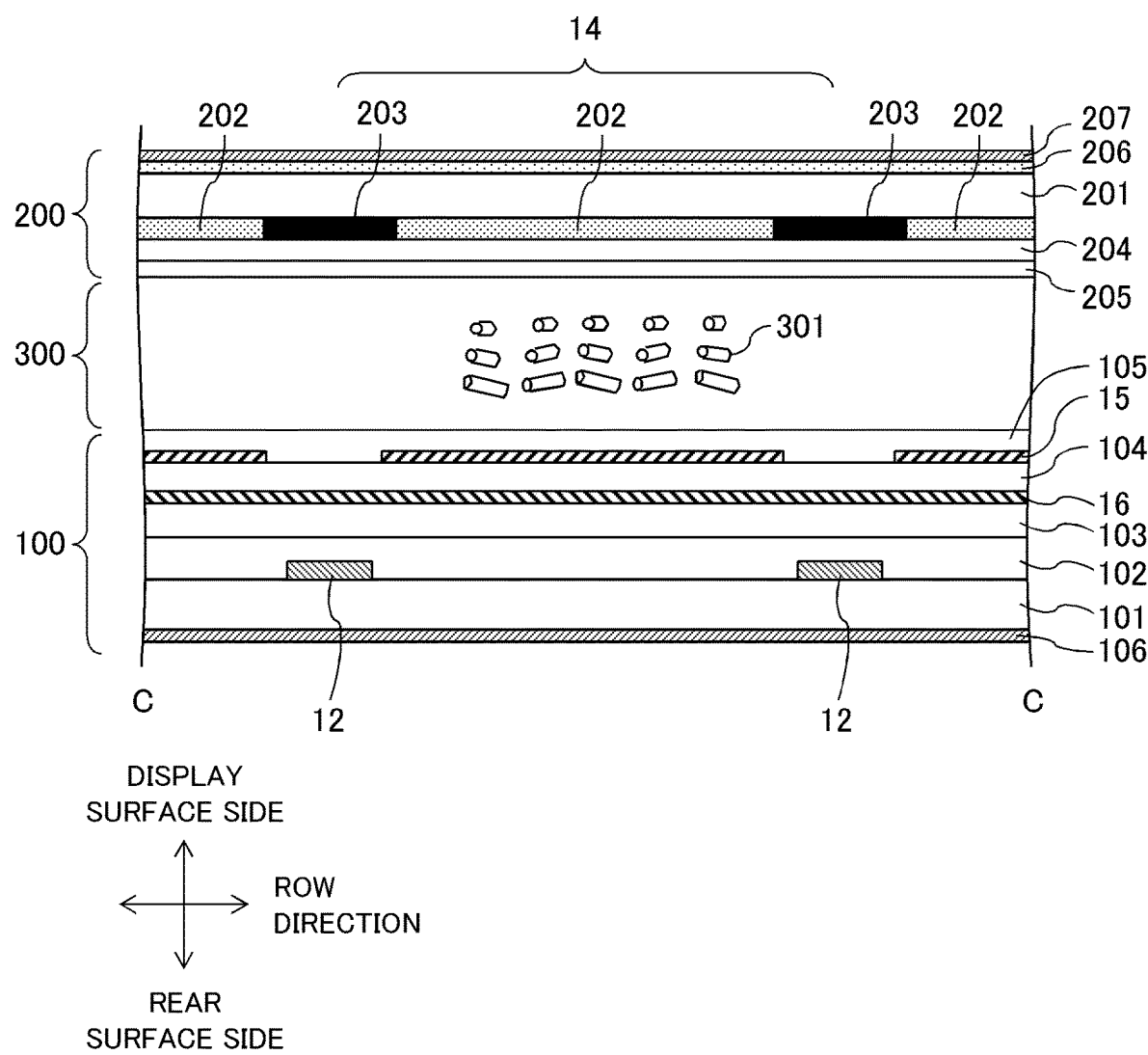
FIG. 9 is a schematic sectional view taken along line C-C in FIG. 8.
Figure 10:
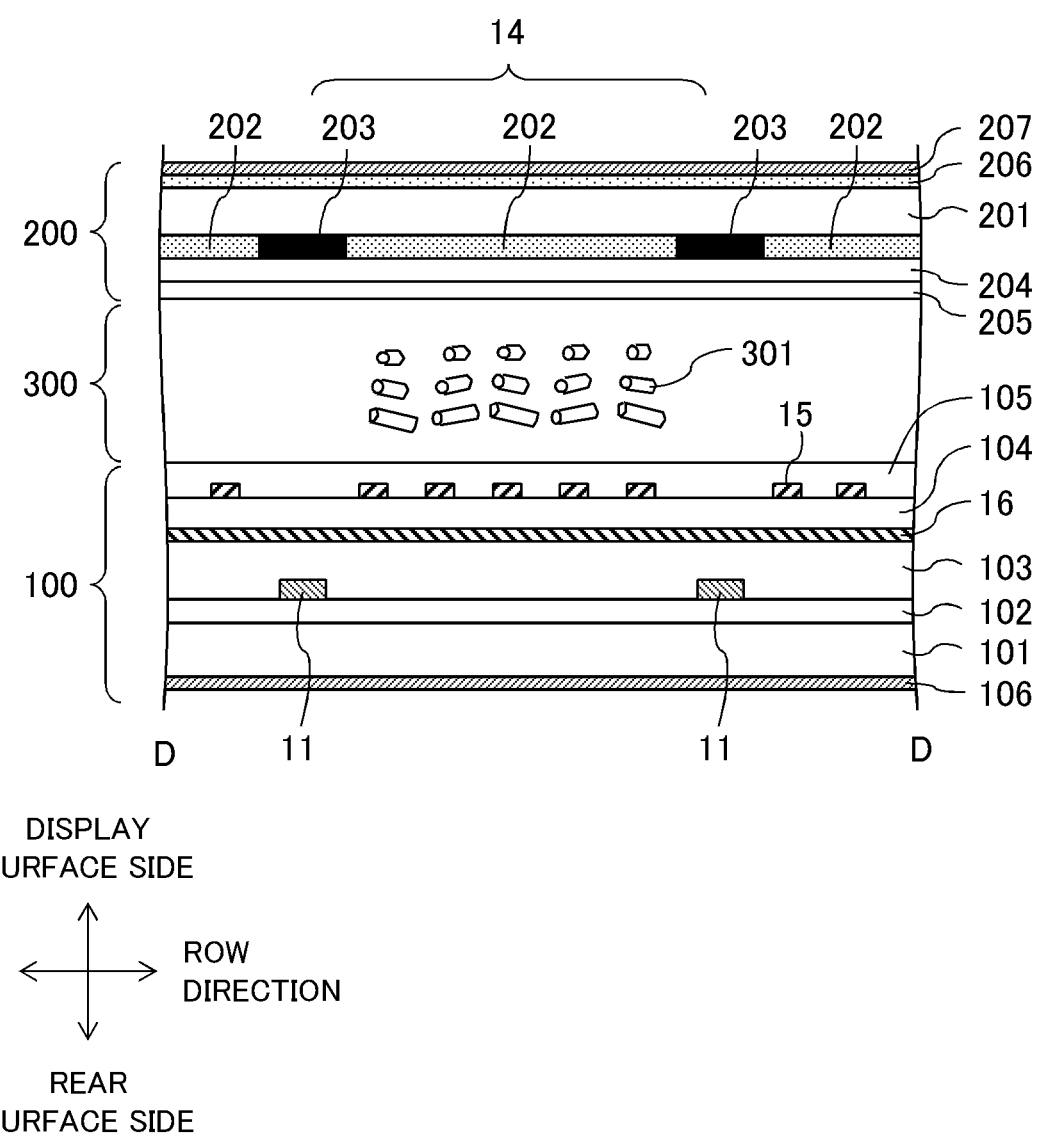
FIG. 10 is a schematic sectional view taken along line D-D of FIG. 8.

FIG. 8 is a plan view illustrating a specific configuration of pixels 14 of display panel 10. FIG. 9 is a sectional view taken along line C-C in FIG. 8, and FIG. 10 is a sectional view taken along line D-D of FIG. 8. The specific configuration of pixel 14 will be described with reference to FIGS. 8 to 10.

In FIG. 8, a region that is partitioned by two adjacent data lines 11 and two adjacent gate lines 12 in planar view of display panel 10 corresponds to one pixel 14. TFT 13 is provided in each pixel 14. TFT 13 includes semiconductor layer 21 formed on insulating film 102 (see FIGS. 9 and 10) and drain electrode 22 and source electrode 23 that are formed on semiconductor layer 21. Drain electrode 22 is electrically connected to data line 11, and source electrode 23 is electrically connected to pixel electrode 15 through through-hole 24.

Pixel electrode 15 made of a transparent conductive material such as indium tin oxide (ITO) is formed in each pixel 14. Pixel electrode 15 includes a plurality of openings (slits), and is formed into a stripe shape. There is no limitation on a shape of the opening. One common electrode 16 made of the transparent conductive material such as ITO is formed in common to each pixel 14 over a display region. An opening (corresponding to a dotted-line enclosure in FIG. 8) is formed in a region where common electrode 16 overlaps through-hole 24 and source electrode 23 of TFT 13 in order to electrically connect pixel electrode 15 and source electrode 23.

As illustrated in FIGS. 9 and 10, display panel 10 includes thin film transistor substrate 100, counter substrate 200, and liquid crystal layer 300 sandwiched between thin film transistor substrate 100 and counter substrate 200.

In thin film transistor substrate 100, gate line 12 (see FIG. 5) is formed on glass substrate 101, and insulating film 102 is formed so as to cover gate line 12. Data line 11 (see FIG. 6) is formed on insulating film 102, and insulating film 103 is formed so as to cover data line 11. Common electrode 16 is formed on insulating film 103, and insulating film 104 is formed so as to cover common electrode 16. Pixel electrode 15 is formed on insulating film 104, and alignment film 105 is formed so as to cover pixel electrode 15. Polarizing plate 106 is provided on the rear surface side of glass substrate 101.

In counter substrate 200, black matrix 203 and colored portion 202 (for example, a red portion, a green portion, and a blue portion) are formed on glass substrate 201, and overcoat layer 204 is formed so as to cover black matrix 203 and colored portion 202. Alignment film 205 is formed on overcoat layer 204. Conductive layer 206 is provided on the surface (front surface) of glass substrate 201 on the display surface side (the side opposite to the liquid crystal layer 300 side), and polarizing plate 207 is provided on the surface (front surface) of conductive layer 206 on the display surface side (the side opposite to the liquid crystal layer 300 side).

Liquid crystal 301 is enclosed in liquid crystal layer 300. Liquid crystal 301 may be negative type liquid crystal having a negative dielectric anisotropy, or positive type liquid crystal having a positive dielectric anisotropy. Alignment films 105, 205 may be an alignment film subjected to rubbing alignment treatment, or an optical alignment film subjected to optical alignment treatment.

[Method for Manufacturing Liquid Crystal Display Device]

Figure 11:
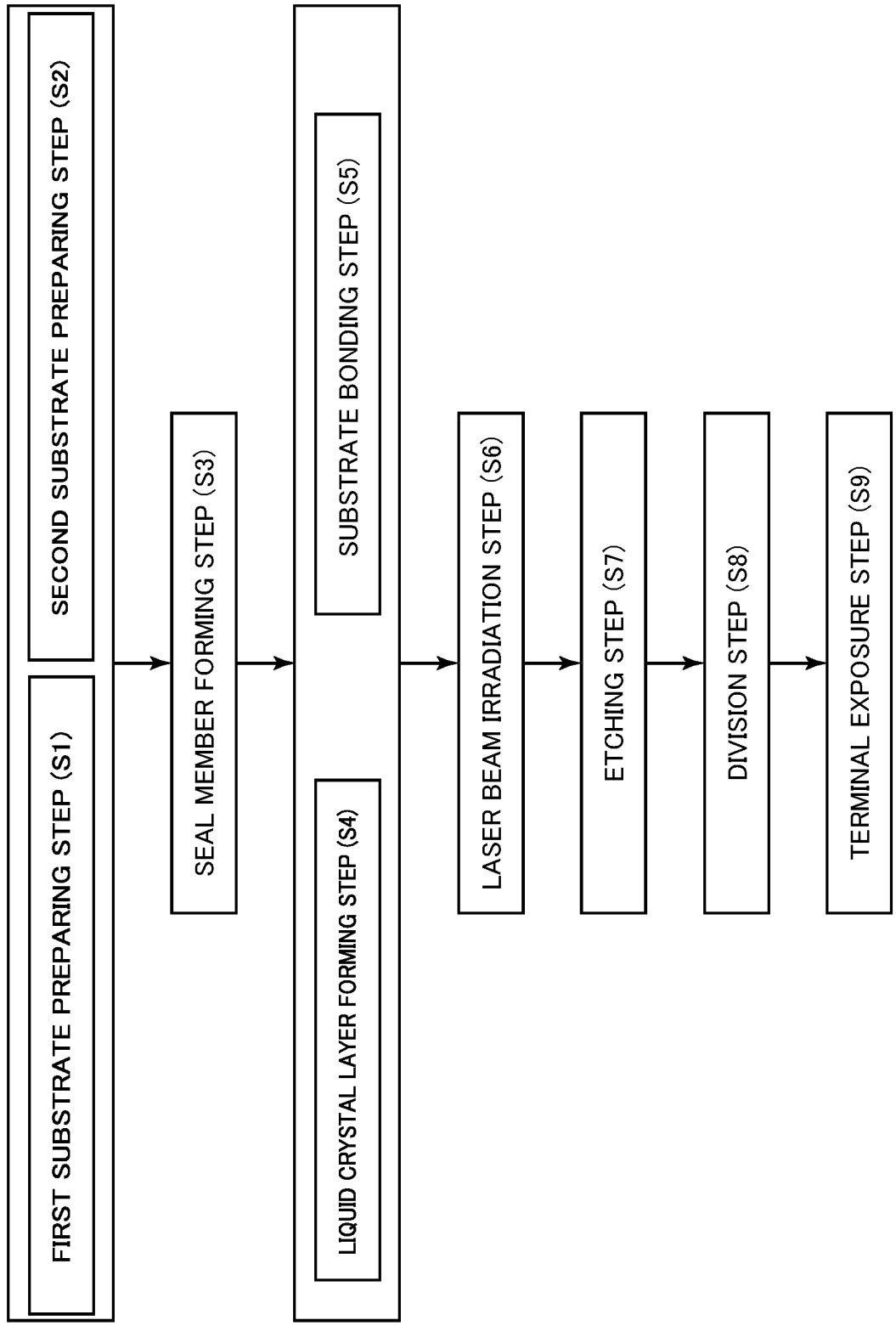
FIG. 11 is a flowchart illustrating the method for manufacturing a liquid crystal display device according to an exemplary embodiment.

A method for manufacturing liquid crystal display device 1 of the exemplary embodiment will be described below. FIG. 11 is a flowchart illustrating the method for manufacturing a liquid crystal display device of the exemplary embodiment.

As illustrated in FIG. 11, the method for manufacturing liquid crystal display device 1 includes a first substrate preparing step (S1), a second substrate preparing step (S2), a seal member forming step (S3), a liquid crystal layer forming step (S4), a substrate bonding step (S5), a laser beam irradiation step (S6), an etching step (S7), a division step (S8), and a terminal exposure step (S9).

The first substrate preparing step (S1) is a step of preparing first substrate 100A including thin film transistor substrate 100. The second substrate preparing step (S2) is a step of preparing second substrate 200A that includes counter substrate 200, is disposed on the display surface side of first substrate 100A in a substrate bonding step (to be described later), and is opposed to first substrate 100A. The order of performing the first substrate preparing step (S1) and the second substrate preparing step (S2) is not considered.

Figure 12:
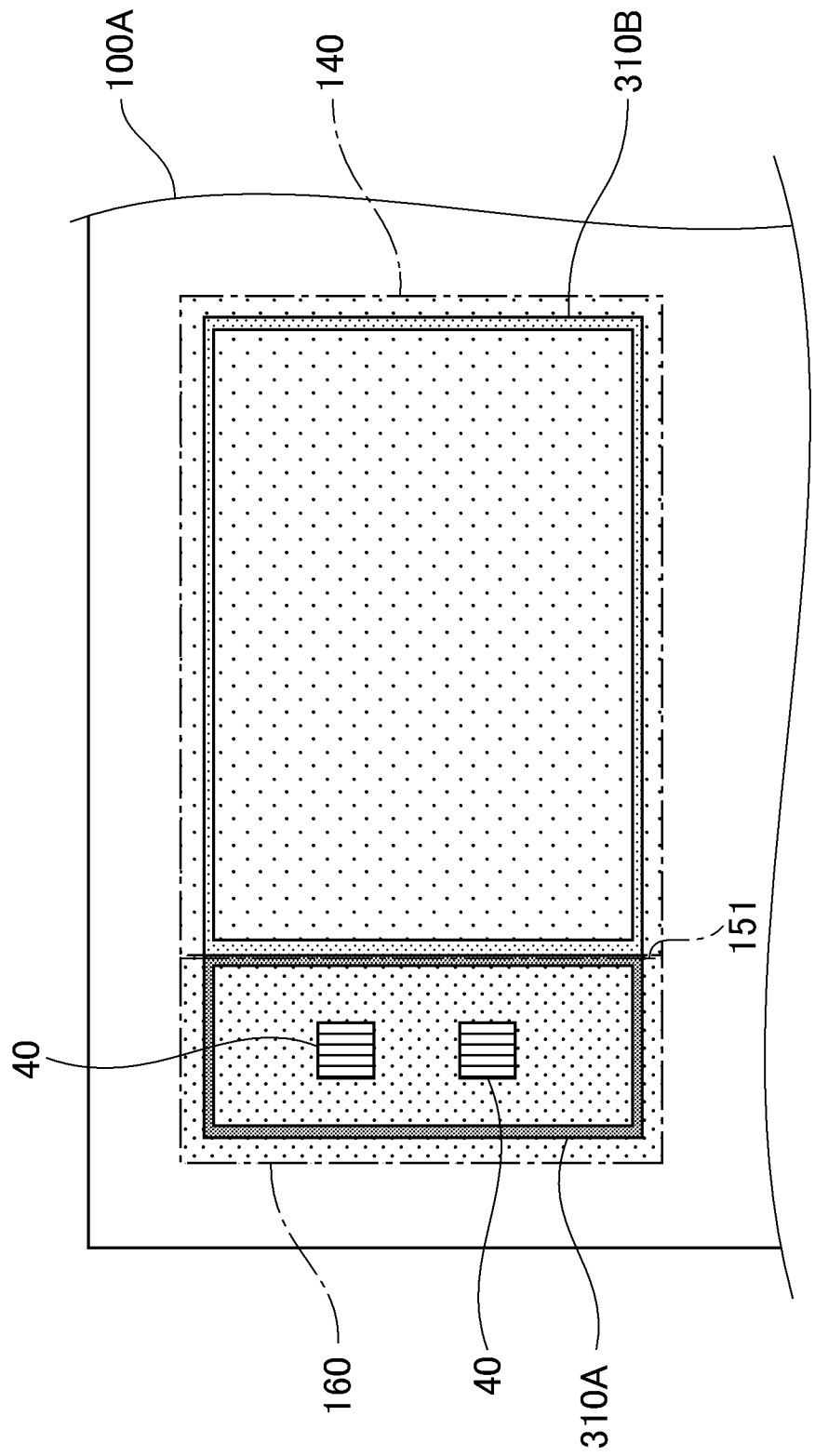
FIG. 12 is a schematic plan view illustrating the method for manufacturing a liquid crystal display device according to the exemplary embodiment.
Figure 13:
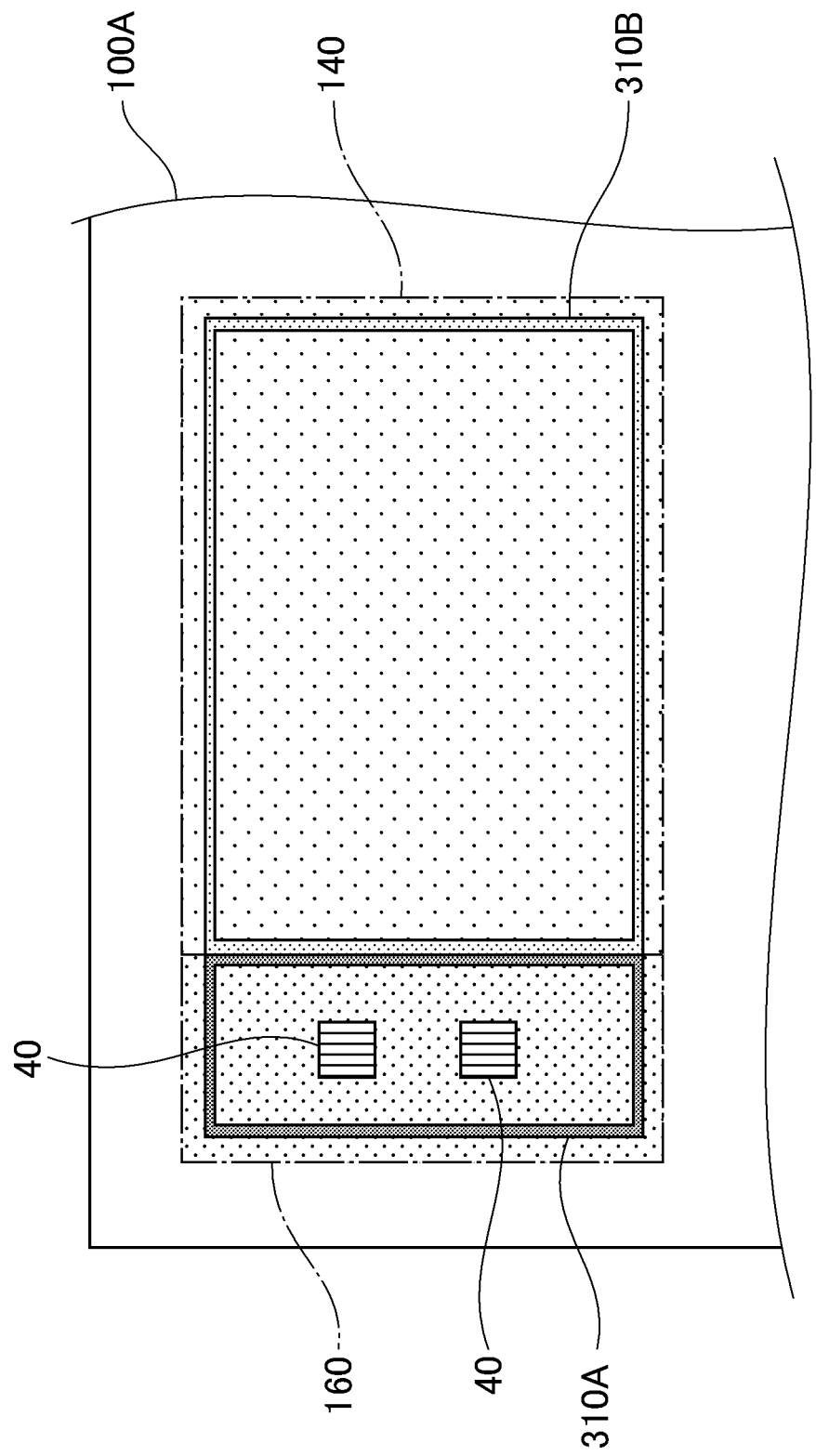
FIG. 13 is a schematic plan view illustrating the method for manufacturing a liquid crystal display device according to the exemplary embodiment.

The seal member forming step (S3) is performed after performing the first substrate preparing step (S1) and the second substrate preparing step (S2). FIGS. 12 and 13 are schematic plan views illustrating the method for manufacturing a liquid crystal display device of the exemplary embodiment. The seal member forming step (S3) will be described below with reference to FIGS. 12 and 13.

In the exemplary embodiment, the seal member forming step (S3) includes a first seal member forming step and a second seal member forming step.

In the first seal member forming step, annular first seal member 310A surrounding the outer periphery of terminal portion 40 is formed between first substrate 100A and second substrate 200A. First seal member 310A is disposed at a position corresponding to non-overlapping part 160. Because non-overlapping part 160 in FIGS. 12 and 13 is in a state before the division step (S8) (to be described later), non-overlapping part 160 has an area larger than that of non-overlapping part 160 in FIGS. 1 and 2. First seal member 310A is a seal member that hardly exists in liquid crystal display device 1 described with reference to FIG. 1, and is a seal member that protects terminal portion 40 in the etching step (S7) (to be described later).

Annular second seal member 310B disposed along an outer edge of overlapping part 140 in planar view is formed in the second seal member forming step. Second seal member 310B constitutes most of seal member 310 existing in liquid crystal display device 1 described with reference to FIG. 1, and is a seal member that surrounds the periphery of the liquid crystal layer.

A part of each of first seal member 310A and second seal member 310B is formed along first side 151 that is a boundary between overlapping part 140 and non-overlapping part 160.

As illustrated in FIG. 13, first seal member 310A and second seal member 310B may integrally be formed along first side 151. In the exemplary embodiment, the following steps will be described using an example in which first seal member 310A and second seal member 310B are integrally formed along first side 151 as illustrated in FIG. 13.

The liquid crystal layer forming step (S4) and the substrate bonding step (S5) are performed after the seal member forming step (S3).

Figure 14:
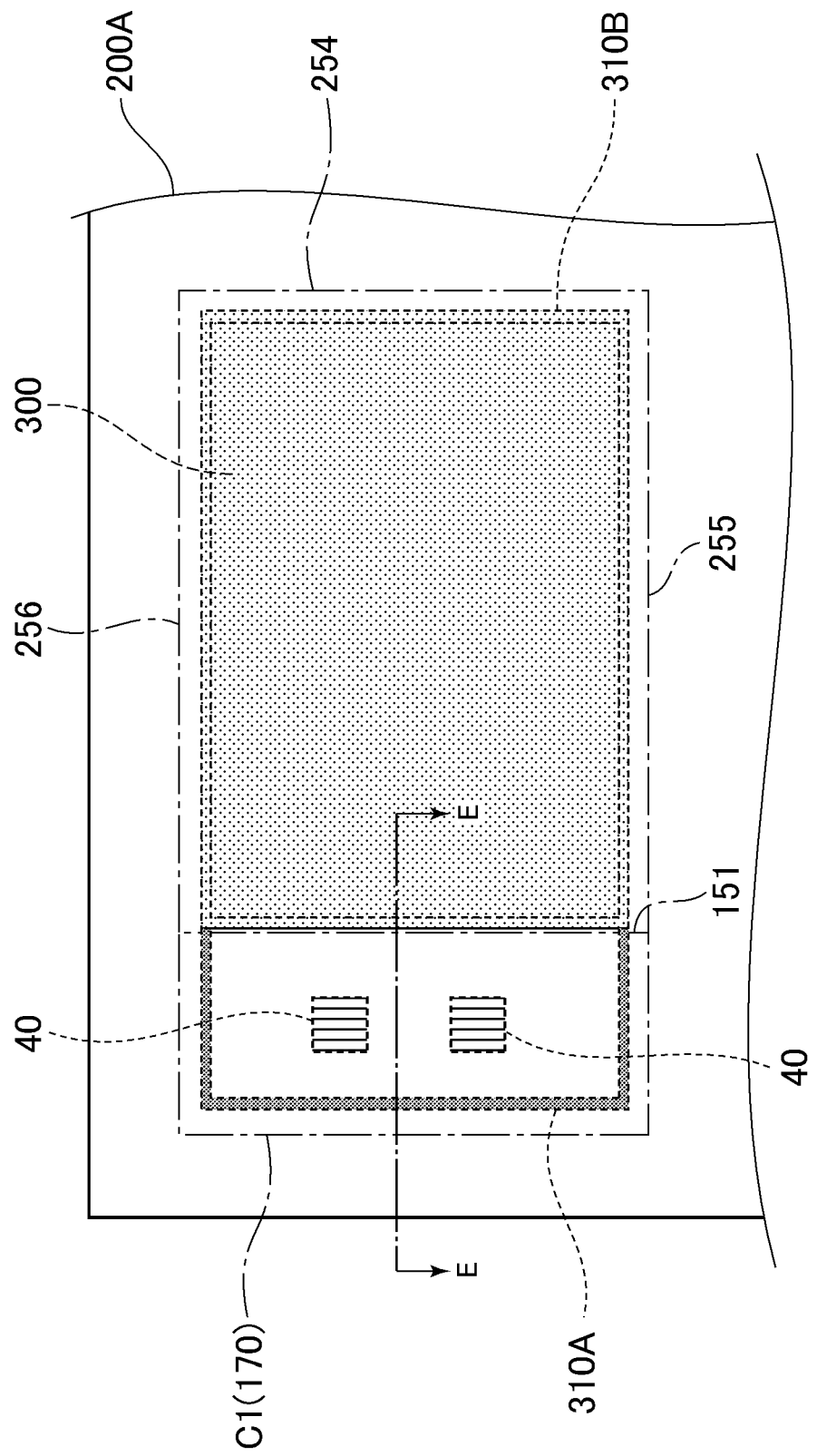
FIG. 14 is a schematic plan view illustrating the method for manufacturing a liquid crystal display device according to the exemplary embodiment.
Figure 15:
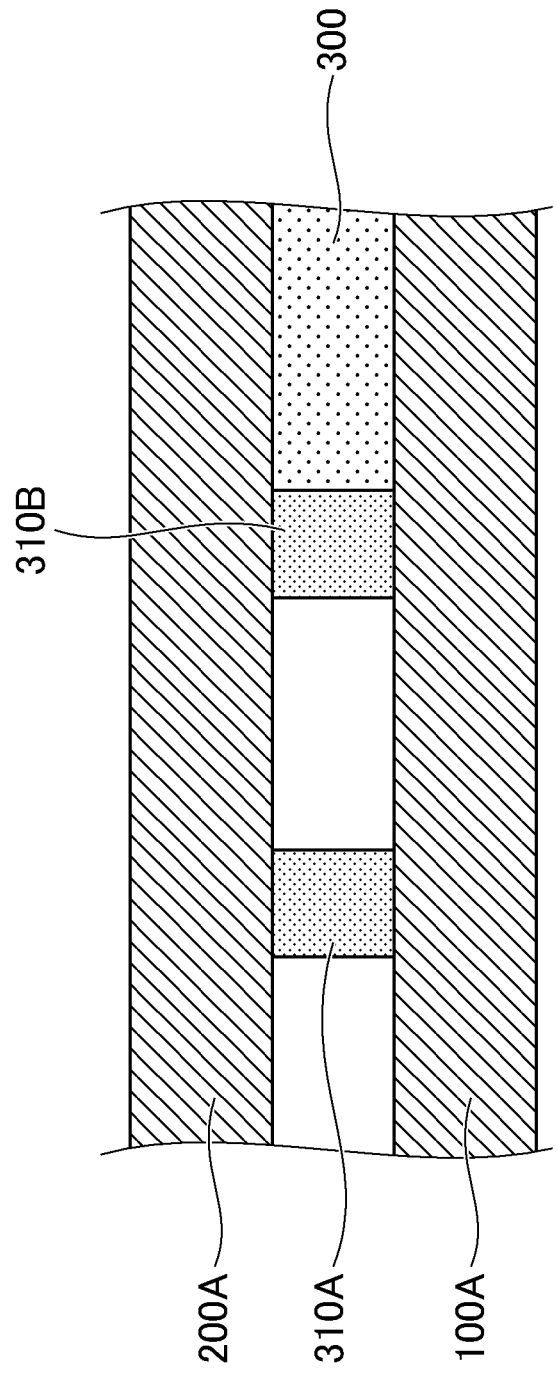
FIG. 15 is a schematic sectional view taken along line E-E in FIG. 14.

The liquid crystal layer forming step (S4) is a step of forming liquid crystal layer 300 on the inner peripheral side of annular second seal member 310B, and the substrate bonding step (S5) is a step of bonding the first main surface (display surface side) of first substrate 100A and the second main surface (rear surface side) of second substrate 200A using first seal member 310A and second seal member 310B. FIG. 14 is a schematic plan view illustrating the method for manufacturing a liquid crystal display device of the exemplary embodiment. FIG. 15 is a schematic sectional view illustrating a section taken along line E-E in FIG. 14. The liquid crystal layer forming step (S4) and the substrate bonding step (S5) will be described below with reference to FIGS. 14 and 15.

As a first example in which the liquid crystal layer forming step (S4) and the substrate bonding step (S5) are performed, second seal member 310B is formed on the first main surface (display surface side) of first substrate 100A in the seal member forming step (S3), liquid crystal layer 300 is formed by dropping liquid crystal on the inner peripheral side of second seal member 310B, first substrate 100A and second substrate 200A are bonded together, and second seal member 310B is cured by irradiating second seal member 310B with an ultraviolet ray. As a second example, second seal member 310B is formed on the second main surface (rear surface side) of second substrate 200A in the seal member forming step (S3), liquid crystal layer 300 is formed by dropping liquid crystal on the inner peripheral side of second seal member 310B, first substrate 100A and second substrate 200A are bonded together, and second seal member 310B is cured by irradiating second seal member 310B with the ultraviolet ray. As a third example, after first substrate 100A and second substrate 200A are bonded together, the liquid crystal is injected into the region surrounded by second seal member 310B to form liquid crystal layer 300. Thus, the order of performing the liquid crystal layer forming step (S4) and the substrate bonding step (S5) is not considered.

The laser beam irradiation step (S6) is performed after the liquid crystal layer forming step (S4) and the substrate bonding step (S5). The laser beam irradiation step (S6) is a step of irradiating first substrate 100A and second substrate 200A with a laser beam in division line C1 of FIG. 14. Division line C1 overlaps with the outer edge of entire region 170 including the region where first seal member 310A is formed and the region where second seal member 310B is formed in planar view. As used herein, entire region 170 is a region including the region where first seal member 310A and second seal member 310B are formed in planar view and the region from first substrate 100A to second substrate 200A overlapping each other in planar view. That is, entire region 170 includes first substrate 100A to second substrate 200A on the inner peripheral side of division line C1.

In the laser beam irradiation step (S6), division line C1 is scanned with the laser beam. Division line C1 may be irradiated with the laser beam from both sides of first substrate 100A and second substrate 200A, and may be irradiated with the laser beam from either the first substrate 100A side or the second substrate 200A side. At this point, a focusing optical system of laser beam 4 is adjusted such that a focal point of laser beam 4 is located within first substrate 100A and second substrate 200A, which allows a modified region to be formed in first substrate 100A and second substrate 200A.

In this way, because division line C1 is irradiated with the laser beam such that the laser beam overlaps the outer edge of entire region 170 in planar view, first seal member 310A and second seal member 310B that are disposed on the inner peripheral side of entire region 170 are not irradiated with the laser beam. For this reason, there is a low possibility of damaging first seal member 310A and second seal member 310B in the laser beam irradiation step (S6). As a result, a risk of corrosion of terminal portion 40 can be reduced in the etching step (S7) (to be described later).

Desirably, division line C1 scanned with the laser beam does not have a right-angled portion. For example, division line C1 is desirably set such that the end at which fourth side 254 and fifth side 255 intersect each other has a rounded shape. By adopting such a step, the concentration of the stress at the end where fourth side 254 and fifth side 255 intersect each other can be prevented in the etching step (S7), and resultantly the generation of the crack can be prevented in second substrate 200A and first substrate 100A. As described above, in the exemplary embodiment, because the end where fourth side 254 and fifth side 255 intersect each other has the rounded shape, the curvature of the end where fourth side 254 and fifth side 255 intersect each other is smaller than the right angles as illustrated in FIG. 5.

The fifth side 255 is desirably curved outward in planar view as division line C1 scanned with the laser beam. Similarly, sixth side 256 opposed to fifth side 255 is also desirably curved outward in planar view.

In this way, by curving at least one of fifth side 255 and sixth side 256 outward in planar view, as described above with reference to FIG. 6, the generation of the crack of counter substrate 200 and thin film transistor substrate 100 can be prevented in the central portion on which the stress concentrates easily in the case where liquid crystal display device 1 is curved as seen from the side-surface direction.

Figure 16:
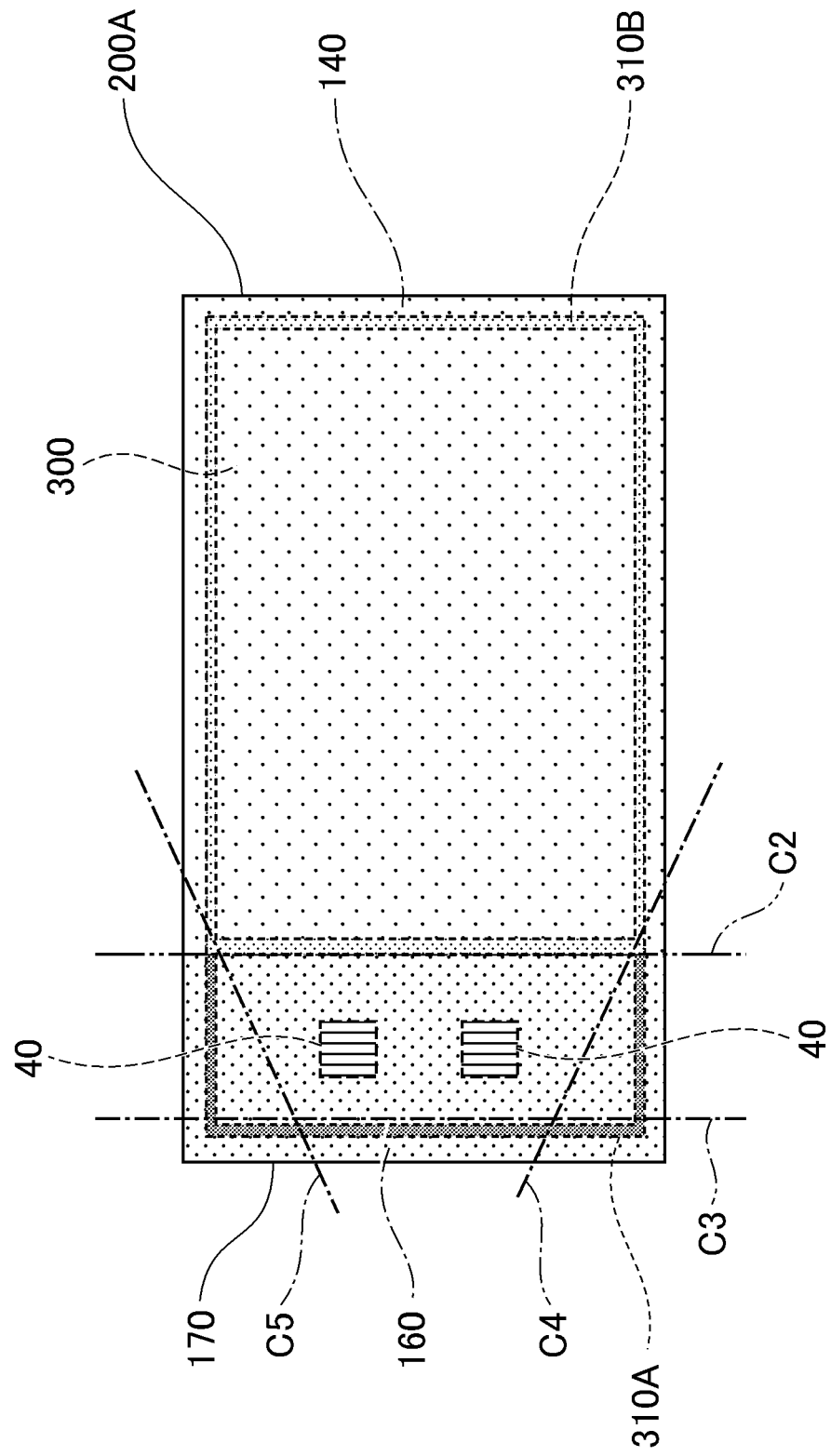
FIG. 16 is a schematic plan view illustrating the method for manufacturing a liquid crystal display device according to the exemplary embodiment.

The etching step (S7) is performed after the laser beam irradiation step (S6). In the etching step (S7), etching is performed using an etching solution to divide first substrate 100A and second substrate 200A along division line C1, namely, the outer edge of entire region 170. For example, the etching is performed by immersing, in an acid or alkaline etching solution, first substrate 100A and second substrate 200A that are bonded to each other. The second main surface (rear surface side) of first substrate 100A and the first main surface (display surface side) of second substrate 200A are thinned in the etching step (S7). At this point, the modified region in the laser beam irradiation step (S7) has a higher etching rate than other regions. For this reason, the modified region is etched deeper than other regions by the etching solution, and a groove is formed in division line C1 of FIG. 14. The groove is deepened with the progress of the etching, and the groove penetrates first substrate 100A and second substrate 200A. Through the etching step (S7), entire region 170 is separated from first substrate 100A and second substrate 200A as illustrated in FIG. 16.

Even in the etching step (S7), first seal member 310A remains, and first seal member 310A protects terminal portion 40. As described above, because first seal member 310A is not damaged by the irradiation of the laser beam in the laser beam irradiation step (S6), first seal member 310A properly plays a role of protecting terminal portion 40 from the etching solution, and the risk of the corrosion of terminal portion 40 can be reduced.

The microcracks generated on the surfaces of division line C1, first substrate 100A, and second substrate 200A are removed in the etching step (S7). Consequently, the generation of the crack of display panel 10 due to the microcrack can be prevented in the subsequent terminal exposure step (S8), a transfer step, and a step of mounting the liquid crystal display device on an electric device.

The ends of first substrate 100A and second substrate 200A have the rounded shape by the etching step (S7). For this reason, as described above with reference to FIGS. 2 and 4, the end where section 264 of fourth side 254 in counter substrate 200 and the display surface of counter substrate 200 intersect each other has the rounded shape.

The division step (S8) of dividing first substrate 100A and second substrate 200A along the outer edge of non-overlapping part 160 is performed after the etching step (S7). In the exemplary embodiment, a part of first seal member 310A is removed from entire region 170 by disposing the outer edge of non-overlapping part 160 on the inner peripheral side of first seal member 310A in the division step (S8).

More specifically, both first substrate 100A and second substrate 200A are cut at division lines C3, C4, and C5 in FIG. 16. Division line C3 corresponds to second side 152 described above with reference to FIG. 1, division line C4 corresponds to first leg 153, and division line C5 corresponds to second leg 154. Non-overlapping part 160 has the trapezoidal shape by cutting both first substrate 100A and second substrate 200A.

Division lines C3, C4, C5 are set on the inner peripheral side of first seal member 310A. Specifically, division line C3 corresponding to second side 152 is disposed on the inner peripheral side of first seal member 310A in planar view, and division line C4 corresponding to first leg 153 and division line C5 corresponding to second leg 154 intersect first seal member 310A at the end of division line C2 in planar view and intersect division line C3 on the inner peripheral side of first seal member 310A. As a result, first seal member 310A can be removed from display panel 10 without weakening adhesive force of first seal member 310A using a release agent or without peeling off first seal member 310A with tweezers. Thus, division lines C4 and C5 have an angle smaller than 90 degrees with respect to division line C2. As a result, non-overlapping unit 160 has the non-rectangular shape, and has the trapezoidal shape in the exemplary embodiment.

The terminal exposure step (S9) is performed after the division step (S8). In the terminal exposure step (S9), second substrate 200A is cut along the boundary between overlapping part 140 and non-overlapping part 160 to separate counter substrate 200 in FIG. 1 from second substrate 200A. Specifically, only second substrate 200A is cut along division line C2 in FIG. 16. For example, a scribing step and a break step can be combined as a cutting method.

Figure 17:
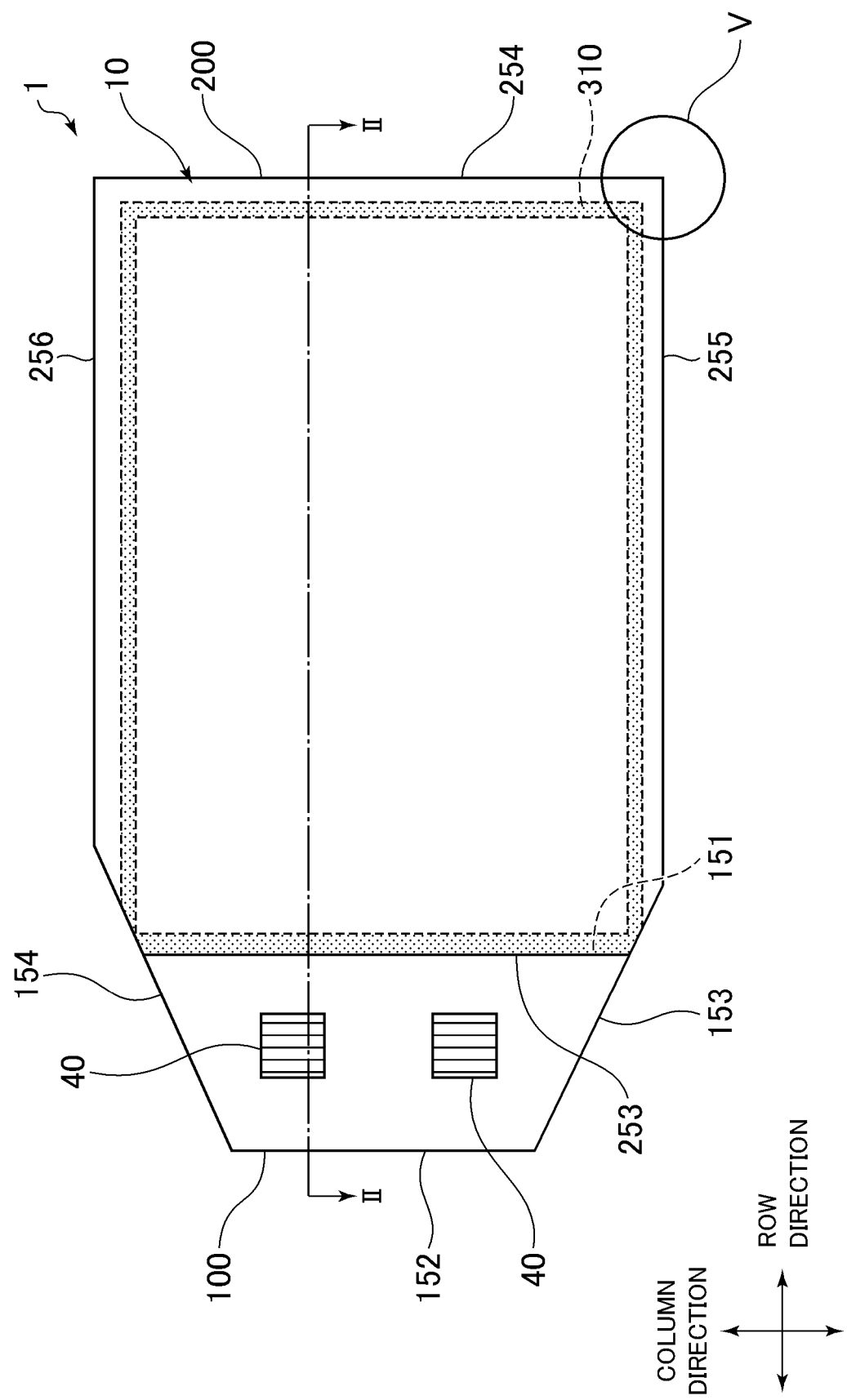
FIG. 17 is a schematic plan view illustrating the method for manufacturing a liquid crystal display device according to the exemplary embodiment.

Second substrate 200A is cut along the boundary between overlapping part 140 and non-overlapping part 160 (division line C2 in FIG. 16) to separate counter substrate 200 from second substrate 200A. Consequently, as illustrated in FIG. 17, terminal portion 40 disposed on the display surface side of thin film transistor substrate 100 can be exposed from counter substrate 200. A part of first seal member 310A disposed outside the outer edge of non-overlapping part 160 is removed in the division step (S8), so that a part of second substrate 200A overlapping non-overlapping part 160 in planar view can easily be removed.

Liquid crystal display device 1 in which the risk of the corrosion of terminal portion 40 is reduced can be manufactured by the above manufacturing method.

An example in which liquid crystal display device 1 is mounted on the electric device while being curved will be described. FIG. 6 is a schematic side view illustrating an example in which liquid crystal display device 1 is built in the electric device. In the exemplary embodiment, first holding member 401, between which the display surface side of counter substrate 200 and the rear surface side of thin film transistor substrate 100 are sandwiched at the position where the electric device overlaps with third side 253 in FIG. 1 in planar view, and second holding member 402, between which the display surface side of counter substrate 200 and the rear surface side of thin film transistor substrate 100 are sandwiched at the position where the electric device overlaps with fourth side 254 in FIG. 1 in planar view, are provided as illustrated in FIG. 6.

As described above in the etching step (S7), the microcracks generated on the surfaces of division line C1, first substrate 100A, and second substrate 200A are removed. However, there is a possibility that the microcracks remain at each edge of non-overlapping part 160 of thin film transistor substrate 100 cut in the terminal exposure step (S9) after the etching step (S7). For this reason, in the exemplary embodiment, first holding member 401 and second holding member 402 are disposed so as to overlap with overlapping part 140 in planar view, so that the average curvature in non-overlapping part 160 is smaller than the minimum curvature in overlapping upart 140 when viewed from the side-surface direction. With this configuration, as compared with overlapping part 140, the generation of the crack of display panel 10 due to the microcrack can be prevented in non-overlapping part 160 that has a higher possibility that the microcrack remains.

As described above, liquid crystal display device 1 manufactured by the manufacturing method described in the exemplary embodiment includes counter substrate 200 and thin film transistor substrate 100. At least one of counter substrate 200 and thin film transistor substrate 100 is formed by chemically etching the section of a part of the outer shape in the etching step (S7) and the section of other parts of the outer shape is formed not by the chemical division but by a physical division such as scrub division or laser division in the division step (S8) or the terminal exposure step (S9). As a result, in the section of the outer shape of counter substrate 200 or thin film transistor substrate 100, the portion formed by the chemical division has few microcracks, and has a structure that is relatively strong against an external pressure. On the other hand, in the section of the outer shape of counter substrate 200 or thin film transistor substrate 100, the portion formed by the physical division has many microcracks, and a structure that is relatively weak against the external pressure, as compared with the portion formed by the chemical division. Thus, in the outer shape of counter substrate 200 or thin film transistor substrate 100, preferably, the portion formed by the chemical division is increased as large as possible and the portion formed by the physical division is decreased as small as possible.

In the above, the specific embodiments of the present application have been described, but the present application is not limited to the above-mentioned embodiments, and various modifications may be made as appropriate without departing from the spirit of the present application. Additionally, the above-described manufacturing steps may be appropriately changed in order, except when particularly conditions are set, and it is not necessary to be limited to the order described in the present embodiment.

What is claimed is:

1. A method for manufacturing a liquid crystal display device including a thin film transistor substrate including a thin film transistor array and a counter substrate opposed to the thin film transistor substrate, the thin film transistor substrate including an overlapping part that overlaps with the counter substrate in planar view and a non-overlapping part that includes a terminal portion and does not overlap with the counter substrate in planar view, the liquid crystal display device manufacturing method comprising:
    a first substrate preparing step of preparing a first substrate including the thin film transistor substrate;
    a second substrate preparing step of preparing a second substrate including the counter substrate;
    a first seal member forming step of forming an annular first seal member surrounding an outer periphery of the terminal portion in planar view between the first substrate and the second substrate;
    a second seal member forming step of forming an annular second seal member disposed along an outer edge of the overlapping part in planar view between the first substrate and the second substrate;
    an etching step of separating an entire region including a region where the first seal member is formed and a region where the second seal member is formed in planar view from the first substrate and the second substrate by performing wet etching of an outer edge of the entire region;
    a division step of dividing the first substrate and the second substrate along a part of an outer edge of the non-overlapping part after the etching step; and
    a terminal exposure step of separating the counter substrate from the second substrate by cutting the second substrate along a boundary between the overlapping part and the non-overlapping part after the division step.

2. The method for manufacturing a liquid crystal display device according to claim 1, wherein in the division step, the outer edge of the non-overlapping part is disposed on an inner peripheral side of the first seal member, and a part of the first seal member is removed from the entire region.

3. The method for manufacturing a liquid crystal display device according to claim 2, wherein a part of each of the first seal member and the second seal member is formed along a first side that is a boundary between the overlapping part and the non-overlapping part.

4. The method for manufacturing a liquid crystal display device according to claim 3, wherein the first seal member and the second seal member are integrated along the first side.

5. The method for manufacturing a liquid crystal display device according to claim 3, wherein
    the non-overlapping part has a substantially trapezoidal shape, and
    the division step includes:
    a step of cutting the first substrate in a second side that constitutes the outer edge of the non-overlapping part and is opposed to the first side and a first leg and a second leg that connect the first side and the second side and constitute the outer edge of the non-overlapping part; and
    a step of cutting the second substrate so as to overlap with the first side, the second side, the first leg, and the second leg in planar view.

6. The method for manufacturing a liquid crystal display device according to claim 5, wherein in the step of cutting the first substrate and the step of cutting the second substrate, the second side is disposed on the inner peripheral side of the first seal member in planar view, and the first leg and the second leg intersect the first seal member in planar view.

7. The method for manufacturing a liquid crystal display device according to claim 1, further comprising a laser beam irradiation step of irradiating the first substrate and the second substrate with a laser beam so as to overlap with the outer edge of the entire region in planar view before the etching step.

8. The method for manufacturing a liquid crystal display device according to claim 7, wherein the counter substrate includes a third side that overlaps with a first side that is a boundary between the overlapping part and the non-overlapping part in planar view, a fourth side opposed to the third side, and a fifth side intersecting the fourth side, and the first substrate and the second substrate are irradiated with the laser beam such that the fifth side is curved outward in planar view in the laser beam irradiation step.

9. The method for manufacturing a liquid crystal display device according to claim 1, further comprising a curvature step of curving the overlapping part when viewed from a side-surface direction.

10. The method for manufacturing a liquid crystal display device according to claim 9, wherein an average curvature in the non-overlapping part is smaller than a minimum curvature in the overlapping part when viewed from the side-surface direction in the curvature step.

\* \* \* \* \*